METHOD OF CARD MANUFACTURE

Filed May 19, 1969 3 Sheets-Sheet 1

INVENTORS
Daniel J. Bandenburg
Paul A. Robert
BY Wood, Herron & Evans
ATTORNEYS

Aug. 3, 1971 D. J. BANDENBURG ET AL 3,597,294

METHOD OF CARD MANUFACTURE

Filed May 19, 1969 3 Sheets-Sheet 2

INVENTORS
Daniel J. Bandenburg
BY Paul A. Robert
Wood, Herron & Evans
ATTORNEYS

METHOD OF CARD MANUFACTURE

Filed May 19, 1969 3 Sheets-Sheet 3

INVENTORS
Daniel J. Bandenburg
BY Paul G. Robert
Wood, Herron and Evans
ATTORNEYS United States Patent Office 3,597,294

Patented Aug. 3, 1971

3,597,294

METHOD OF CARD MANUFACTURE

Daniel J. Bandenburg and Paul A. Robert, Cincinnati, Ohio, assignors to OK Partnership, Cincinnati, Ohio Filed May 19, 1969, Ser. No. 825,545
Int. Cl. B32b 31/00
U.S. Cl. 156—267 14 Claims

ABSTRACT OF THE DISCLOSURE

The method of manufacturing edge notchable cards having ferromagnetic implants for use in automatic data retrieval apparatus. The cards are first died out to form a generally rectangular card blank having a notched out corner with two coined bands along its edges. A ferromagnetic chip is inserted in the notch and is tacked in place by a loop of heat sealable tape which partially covers the chip and lies in the coined areas. The tape is then heat sealed to firmly bond it to the chip and card. The card is then died again with a portion of the chip, front card edge and rear card edge being removed and the entire coding edge formed including spaced teeth and a locking notch. The coding edge of the card is then impregnated with a polyester resin.

This invention relates to the method of producing cards for use in mechanized data retrieval systems. More particularly, the present invention is directed to a method of producing cards of the type including a coding edge having a series of spaced teeth and a ferromagnetic chip disposed along an edge at right angles to the coding edge.

Cards produced in accordance with the present invention are particularly intended for use with automatic card selection apparatus of the type disclosed and claimed in the pending application of Robert D. Parry for "Article Selection System," Ser. No. 661,758, filed Aug. 4, 1967. As disclosed in greater detail in that application, cards of the present type are employed to carry various types of information, for example, printed information, handwritten or typewritten entries, microfilm images or the like. The card is edge coded to describe its contents by removing selected teeth from its coding edge. Thereafter, a large number of cards are stored in a stack of one or more trays with the coding edges of the cards forming one edge of the stack. The ferromagnetic implants of the card are disposed along another edge of the stack designated the "front" edge.

In order to select the desired card or cards, an operator actuates a series of keys to set up the desired code on a series of shiftable code bars disposed to enter the spaces between adjacent teeth in the cards. The selector also includes a movable magnet adapted to be brought into engagement with the ferromagnetic chips of the stack of cards. After the code bars have been raised into the interstitial spaces, this magnet is moved away from the stack to partially withdraw all cards not restrained by the code bars, i.e. cards having teeth removed corresponding to the selected code. Thereafter, all of the cards not initially moved are held in place by a locking bar which is raised into engagement with locking notches in the cards, while the selected cards are separated further by additional outward movement of the magnet.

In order to provide a data retrieval system of maximum utility, it is desirable that the cards used in the system have certain properties. In the first place, it is desirable that the cards have a large number of teeth providing a large coding capability. It is further desirable that the ferromagnetic implant in the cards be of sufficient size to have good ferromagnetic properties so that a card intended to be selected does not accidentally become disengaged from the magnet and left in the stack. It is further desirable that a large number of cards be stackable in a given tray. Accordingly, it is requisite that the ferromagnetic chip be mounted in such a manner that it does not appreciably increase the thickness of the cards. Moreover, in order that the system operate properly, it is essential that the critical dimensions of the card, e.g. the length of the card along the sorting edge, the spacing of the teeth relative to the front edge of the magnet, the relationship of the teeth and the locking notch, and the height of the card be maintained with extreme accuracy. It is further essential that the front edge of the chip be perpendicular to the sorting, or serrated, edge.

It is also desirable to minimize the restraining effects of adjacent cards in a stack with respect to a card being withdrawn by the magnet. Accordingly, it is desirable that the surface of the cards be relatively friction-free. Also, it is important that the overall assembled card and chip have a minimum tendency to warp or "oil can." It is further desirable in many installations that the cards have a relatively long service life, i.e. that the edges of the card, particularly the notched and toothed areas, retain their configuration and dimensions after periods of protracted usage.

The principal object of the present invention is to provide a relatively simple and economical method for fabricating cards having these desiderata.

More particularly, the present method contemplates initially forming card blanks of a generally rectangular configuration from a length of card stock which has previously been sprayed on at least one side with an antifriction coating. This initial card blank does not include the teeth or any other irregular configuration along the coding edge. Moreover, it is slightly oversized with respect to both the final length and height dimensions of the card. As an incident to forming the initial card blank, a chip-receiving recess is formed in one corner of the card and a coined band is formed in the card along each edge of the recess.

In the next step of the method, a ferromagnetic chip is inserted in the recess and is tacked in place by a loop of heat sealable plastic. This plastic strip partially covers both surfaces of the chip and overlies the coined areas on opposite sides of the card.

In the next operation, this strip is completely heat sealed, bonding it to the chip and card and rigidly mounting the chip in position. The thickness of the chip, tape and coined area of the card are related to the original card thickness so that the original card thickness is increased at most by only a negligible amount when the chip is attached. For example, a card of an original thickness of .007″ can be provided with a ferromagnetic chip of .005″ in thickness with a resulting increase of only .0009″ in total card thickness.

In the next step of the process, the card is again subjecting to a dieing operation which simultaneously establishes both working dimensions and configurates the coding edge. More particularly, in this final dieing operation, a U-shaped portion of the card is removed, which U-shaped strip extends entirely across the coding edge of the card as well as along a portion of the front edge and rear edge. Also, a portion of the chip is cut away and a locating notch is formed in the chip. Simultaneously, all of the coding teeth and the locking notch are formed along the coding edge. When the card is trimmed in this manner, it also removes the portion of the plastic strip previously looped over the coding edge of the card so that there is no material along this edge which might tend to become hung up when a card is being separated. By dieing out the card after assembly with a chip, not only are the working length and height of the card accurately established, but also the precise distances between the front edge of the chip and the coding teeth and locking notch are precisely controlled. Moreover, the front edge of the chip is cut perpendicular to the serrated edge.

As a final operation, the coding edge of the card is coated with a polyester resin effective to strengthen the edge of the card to render it substantially more durable.

In accordance with another aspect of the present invention, the chip is inserted in the recess of the card in such a manner that a slight space is created between at least the edge of the chip remote from the front edge of the card and the adjacent portion of the card. This clearance space facilitates mounting the chip in the proper orientation with the card. In other words, without this clearance, if the edge of the chip abuts the card, the chip at times tends to tilt or "oil can."

One advantage of the present method is that it provides a card in which a ferromagnetic chip is mounted with practically no increase in card thickness and yet the chip is strongly held in place so that appreciable sorting forces can be imparted to the card.

More particularly, by holding the chip in place utilizing two opposed strips of tape, the chip is held rigidly in position without a tendency to warp. Moreover, the tape is subjected to a shear force to which it has a high resistance rather than a peel force to which its resistance is substantially lower. Moreover, the present method of chip mounting results in a minimum tendency of the card to distort or warp in any manner which might interfere with card separation.

Another aspect of the present method of fabricating cards is the minimization of dimensional changes in cards due to variations in humidity. In accordance with the present invention, this minimization of the adverse effect of humidity variations is accomplished by storing the paper stock and fabricating the cards in an environment of substantially 50% humidity.

A still further advantage of the present method is that the combination of the coined perimeter surrounding the chip notch and the three-quarter hard stainless steel chip material results in a card which is snappier and has a strong tendency to return to its planar condition in which it is most readily separated.

These and other objects and advantages of the present invention will be more readily apparent from a consideration of the following detailed description of the drawings illustrating the steps of the present card manufacturing process.

Figures 1, 2, 3:
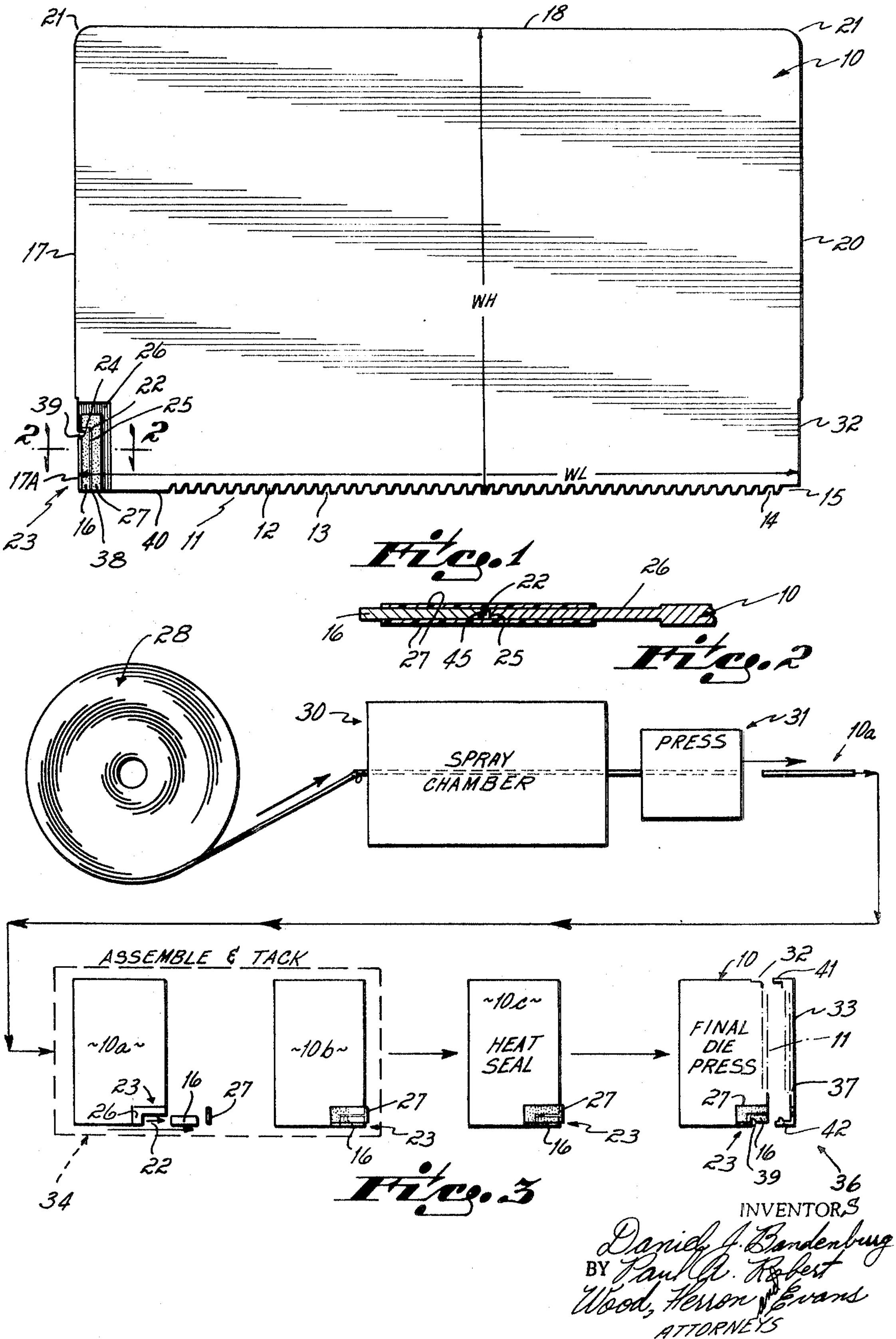
FIG. 1 is an elevational view of one card fabricated in accordance with the present method.
FIG. 2 is an enlarged cross-sectional view taken along line 2—2 of FIG. 1.
FIG. 3 is a schematic flow sheet showing the steps in the present process.

One preferred form of card 10 manufactured in accordance with the principles of the present invention is shown in FIG. 1. As there shown, this card is an edge codable, generally rectangular card formed of a suitable material, such as heavy duty tabulating card stock. The card is particularly adapted for use in automatic data retrieval apparatus of the type disclosed and claimed in the pending patent application of Robert D. Parry for "Article Selection System," Ser. No. 661,758, filed Aug. 4, 1967. In use, card 10 is adapted to carry various types of imprinted or handwritten information or to carry microfilm mounted in an aperture in the card (not shown) in any suitable manner.

As disclosed in detail in the above identified Parry application, a large number, e.g. 1500, of cards are stored in a tray. One or more particular cards corresponding to selected criteria are automatically withdrawn from the stack by the cooperative action of a plurality of code bars, a lock bar and a movable magnet. In order to make possible this automatic selection, the card 10 is provided with a coding edge 11. This coding edge is configured to form a plurality of right trapezoidal teeth 12 separated by notches 13. The coding edge also is provided with a locking notch 14 and a relieved area 15.

A card is coded by selectively removing certain teeth from the coding edge. The remaining teeth and locking notch are adapted for engagement with code bars and a locking bar of the mechanical sorting device. The card 10 additionally carries a ferromagnetic chip 16 mounted in a corner of the card at the junction of the coding edge 11 and the front edge 17 of the card. This chip is engageable by the movable magnet which pulls the selected card from the stack. In addition to the coding edge 11 and front edge 17, card 10 includes an upper edge 18 extending parallel to coding edge 11 and a rear edge 20 extending parallel to front edge 17. The front and rear edges 17 and 20 are connected to upper edge 18 by rounded corners 21.

One preferred form of card 10 is formed of stock having a thickness of .007". As was explained above, it is highly desirable to accommodate a maximum number of these cards in a given length of storage tray. Consequently, it is desirable to mount chip 16 in a manner that will not unduly increase the overall card thickness.

The construction by which a ferromagnetic chip 16 is mounted with a minimum increase of card thickness is best shown in FIGS. 1 and 2. More particularly, as there shown, ferromagnetic chip 16 is a generally rectangular chip of a suitable corrosion-resistant ferromagnetic material, such as three-quarter hard stainless steel. This chip resides within a rectangular recess 22 formed in the corner 23 of the card at the juncture of the coding edge 11 and front edge 17. The rectangular recess 22 is defined by two cut edges 24 and 25 of the card. The card 10 is compressed or "coined" along a band 26 adjacent to each of these edges.

While the exact width of these bands is not critical in one preferred construction they are approximately 1/8" to 3/16" in width. The thickness of the card in these coined areas is reduced by .0015", leaving the card stock approximately .0055" thick. Chip 16 is held in place by a strip of a heat sealable tape 27 which partially overlies the chip and partially overlies the compressed band areas 26. One preferred form of tape is a Mylar tape having a polyethylene coating. Tape 27, as viewed in FIGS. 1 and 2, extends around both surfaces of the chip 16 and card 10. More particularly, tape 27 overlies a substantial portion of chip 16, but does not extend to the forward edge 17 of the card. The remaining portion of the tape is disposed entirely within coined band areas 26. One preferred form of tape has a thickness equal to .0012". As a result the total increase in card thickness due to the presence of a chip and its two layers of mounting tape is only .0009″.

The overall method of fabricating cards in accordance with this invention is shown in the flow sheet of FIG. 3. As there shown, the starting material is a roll 28 of suitable stock, such as heavy duty tabulating card stock. In order to minimize the effects of humidity variations in the end users' installations, roll 28 is preferably stored and the cards are preferably fabricated in an atmosphere maintained at 50% humidity. The roll is unwound and is fed through a spray chamber 30. In this spray chamber one or both surfaces of the card is sprayed with an antifriction compound, such as fluorocarbon solids dissolved in a solution of Freon. One suitable compound of this type is sold by E. I. du Pont de Nemours and Co. under the trademark "Vydax." This antifriction coating is of only a multimolecular thickness and adds no appreciable thickness to the card stock.

Figures 4, 5, 6, 7, 8, 9:
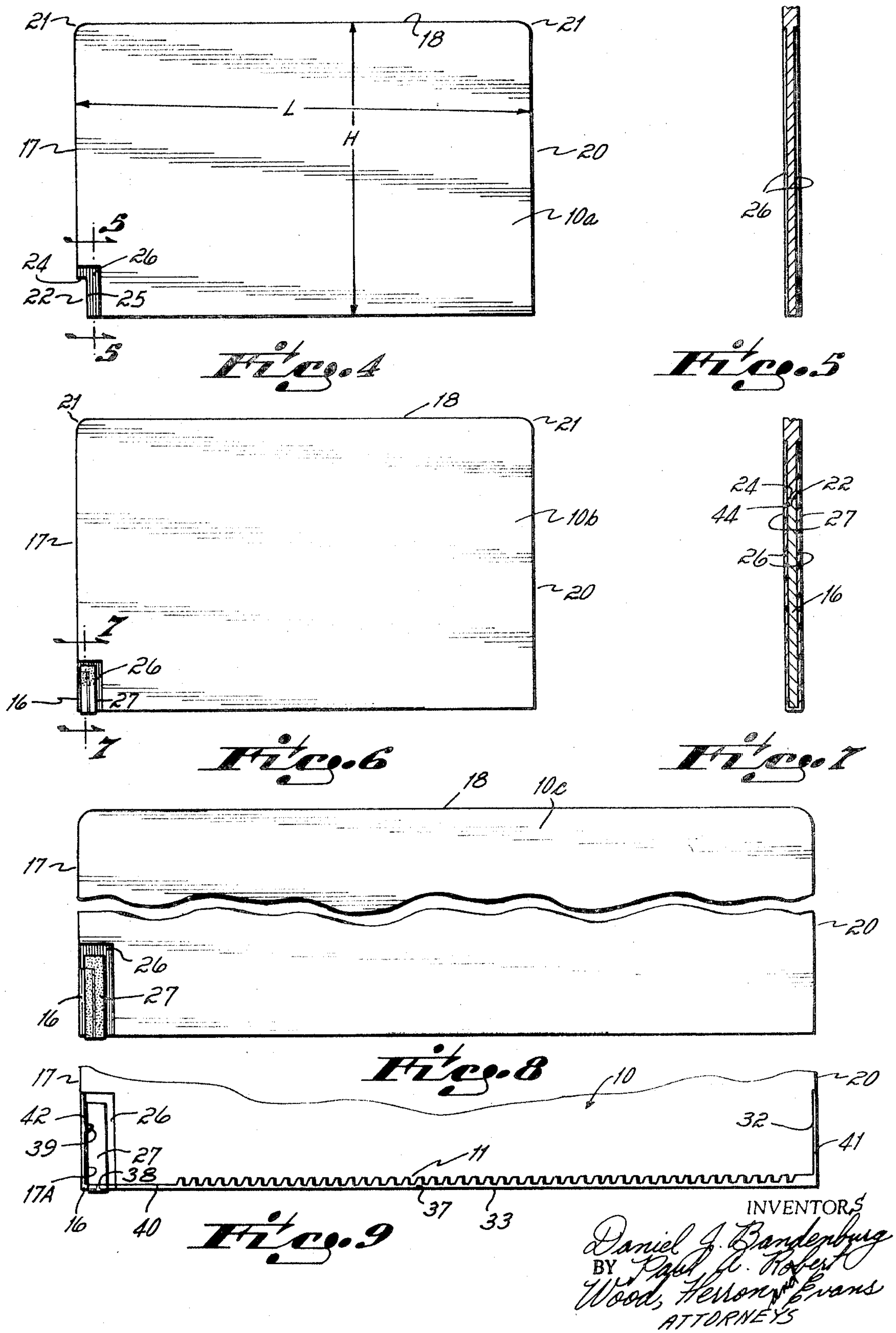
FIG. 4 is a plan view of a card after the initial blanking and coining operation.
FIG. 5 is an enlarged cross-sectional view taken along line 5—5 of FIG. 4.
FIG. 6 is an elevational view of a card with the ferromagnetic chip tacked in position.
FIG. 7 is an enlarged cross-sectional view taken along line 7—7 of FIG. 6.
FIG. 8 is an elevational view of the card after the chip has been heat sealed in place.
FIG. 9 is an elevational view of the bottom portion of the card showing the manner in which the card and chip are trimmed to their final dimensions.
Figure 10:
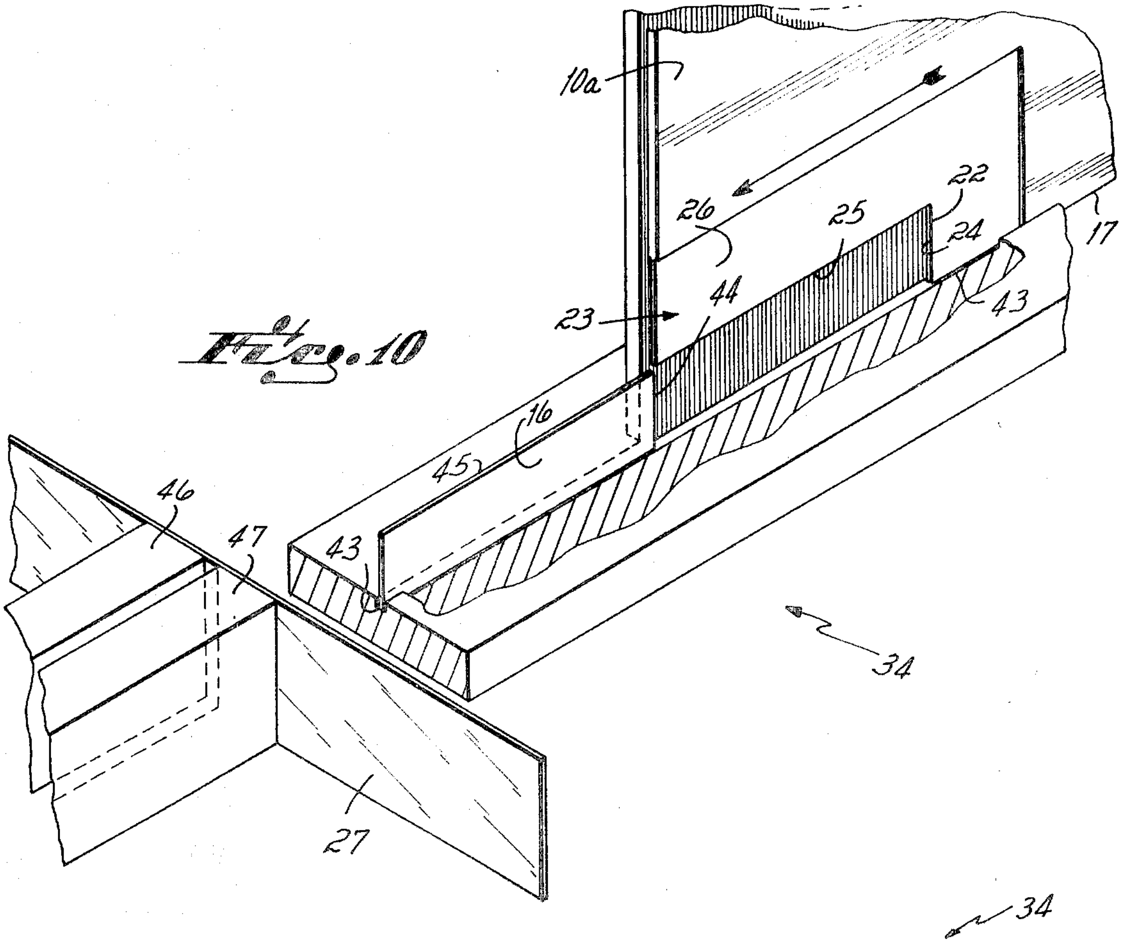
FIG. 10 is a perspective view showing a card and chip in an assembly and tacking fixture.

In the next step, the card is subjected to an initial stamping operation in stamping press 31. The card as stamped at this station is identified as card 10*a* and is shown in FIGS. 4 and 5. Specifically, the card is died out in generally rectangular form and includes front edge 17, rear edge 20, top edge 18 and corner 21. The card also has rectangular recess 22 died out and band areas 26 are coined in each surface of the card. It is to be understood that preferably the card is died and coined in one stroke of the press.

It is important to note that the blank 10*a*, the length of the card, i.e. the distance L between front edge 17 and rear edge 20 is greater than the final critical working length of the card WL between the forward edge 17*a* of chip 16 and a trimmed edge portion 32 of rear edge 20. Also, the card blank 10*a* does not have any teeth 12 or notches 13 formed therein. Moreover, the height H of the card between the upper edge 18 and the lower straight edge 33 is greater than the ultimate working height WH of the card between the lower edges of teeth 12 and upper edge 18.

After the card has been blanked and coined in press 31, it is fed to an assembly and tack station 34. In this station the card is assembled with ferromagnetic chip 16, the chip being inserted in recess 22 and being tacked in place by a strip of tape 27, as is explained in detail below. The blank, after the chip has been tacked in place, is identified as blank 10*b* and is shown in FIGS. 6 and 7.

After the assembling and tacking operation, the card is next subjected to a heat sealing operation in which the tape is heat sealed to firmly bond it to the card and rigidly mount the chip in position. The card subsequently to this operation is identified as card 10*c* and is shown in FIG. 8.

In the final operation, the card 10*c* is subjected to a final die stamping operation as indicated at 36 in FIG. 3. In this operation, the blank 10*c* is placed in a press which performs two functions. In the first place, the die serrates the bottom edge of coding card 11 to form teeth 12 and spaces 13, locking notch 14 and removed area 15. The second function of this final die operation is to establish the two working dimensions, i.e. the working height WH and working length WL of the card. Specifically, the die removes a U-shaped portion of the card 37 so that using the back edge of the card as a reference edge, the die operation establishes the working height WH of the card from the bottom edge of the teeth 12 to the upper edge 18. At the same time, the lower edge of the chip and the U-shaped overfold of tape 27 are removed as indicated at 38 to provide a smooth forward edge portion 40 on the coding edge of the card.

Additionally, the die operation establishes the working length of the card by removing a portion 41 from the rear edge 20 of the card to form a trimmed edge 32 and a portion 42 from the front of chip 16 to form edge 17*a*. This portion removed from the front edge of the chip also includes material from a positioning notch 39 formed in the chip. As a final step, the edges of the card are impregnated with a polyester resin diluted with xylene. This coating is applied by spraying and is effective to substantially increase the life of the card by bonding the cut fibers together, strengthening the teeth and other portions of the coding edge.

Figure 11:
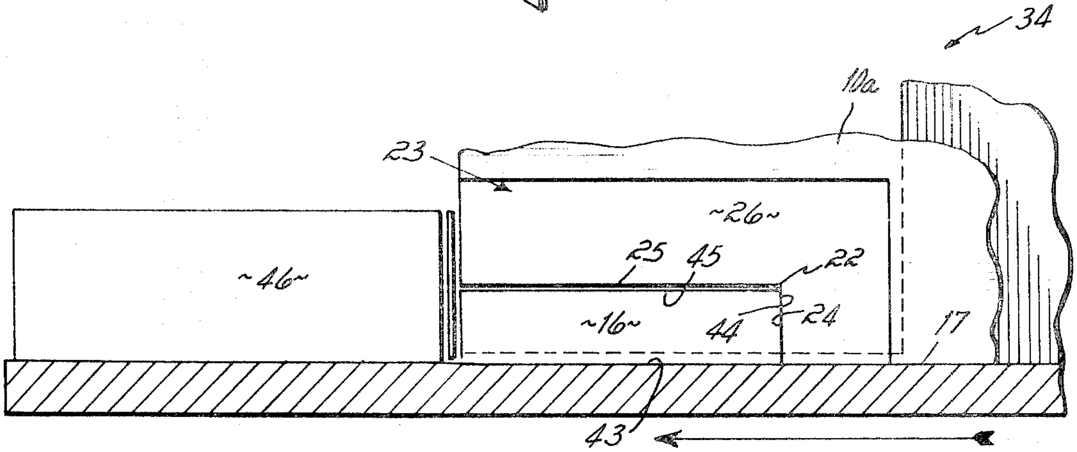
FIG. 11 is a cross-sectional view showing the card and chip in the assembly and tacking fixture with the chip positioned within the card notch immediately prior to engagement with a thermoplastic tape.

The details of the assembling and tacking operation are shown in FIGS. 2–12. As there shown a blank 10*a*, after it has been subjected to the initial stamping operation, is placed along a longitudinal track 43 with the leading edge 17 of the card disposed within the track and the recess 22 and edge 33 forming the advance portion of the card. A ferromagnetic chip 16 is disposed within track 43, the chip being in a corresponding orientation to the orientation of recess 22. As the card advances along the track, it passes over chip 16 until the edge 44 of the chip abuts edge 24 of the recess. As is best shown in FIG. 11, the width of the chip is less than the depth of the slot so that the upper edge 45 of the chip is spaced slightly from edge 25 of the card.

Figure 12:
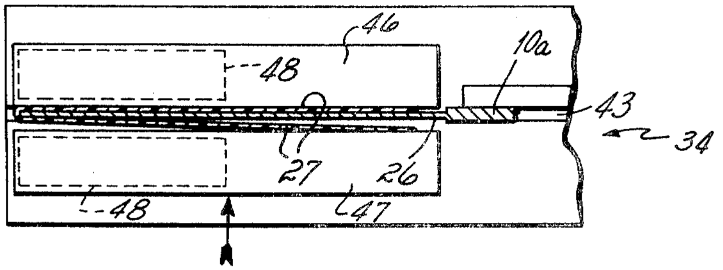
FIG. 12 is a cross-sectional view of a card and chip between the tacking plates.

Continued movement of the card to the left in FIG. 11 causes the chip to be carried with it. The card and chip are thus forced against a strip of tape 27 which is disposed transversely of the path of movement of the card. As the card continues its movement, the strip of tape 27 is bent into a U-shaped configuration as shown in FIG. 12. The length of the strip 27 is such that the ends fall within coined band 26. The card, tape and chip pass between two vertical disposed parallel platens 46 and 47. These platens are heated by heating elements 48. Platen 47 is then shifted toward platen 46 to apply heat and pressure to the tape 27, tacking it to the chip 16 and card 10.

The card is now ready to be transferred to the heat sealing station where heat and pressure are applied to the tape to cause it to become bonded to the chip and card. In one preferred form of the process, during the heat sealing step the tape is subjected to a temperature of approximately 350–375° with a dwell time of one second. Following the heat sealing step, the cards are subjected to the final die stamping operation and are sprayed as described above.

Having described our invention, we claim:

1. The method of fabricating edge codable cards of the type having a coding edge configurated to form a plurality of teeth, a front edge transverse to the coding edge, a rear edge extending parallel to the front edge, and a ferromagnetic chip mounted in a notch at the corner of the front edge and coding edge, the chip presenting an edge at the front edge of the card adapted to be engaged and attracted to a magnet in a mechanized retrieval device, said method comprising the steps of:

dieing out from a sheet of card stock a generally rectangular blank having a front edge and a coding edge,
forming a notch at the corner of said front edge and coding edge,
coining a band along the peripheral edges of said notch,
disposing a ferromagnetic chip in said notch, said chip being thinner than said blank,
placing heat sealable tape on opposite sides of said chip, said tape partially overlying said coined bands,
heat sealing said tape to said chip and said coined bands
subjecting said card to a final dieing operation to configurate said coding edge to form a plurality of teeth and to simultaneously trim said chip along said front edge to establish a relationship between said front edge of the chip and said teeth.

2. The method of claim 1 in which the final dieing operation also removes a portion of said rear edge to establish the working length of said card.

3. The method of claim 1 in which the coding edge of said card is sprayed with a polyester resin.

4. The method of claim 1 in which the sheet of card stock is sprayed with an antifrication spray prior to the first dieing operation.

5. The method of claim 1 in which the chip is disposed in said notch with an edge of the chip spaced from said card.

6. The method of claim 1 in which said card stack is stored at approximately 50% humidity prior to being died out.

7. The method of claim 6 in which said process is carried out at substantially 50% humidity.

8. The method of claim 1 in which said tape is tacked to said chip and said coined bands prior to the heat sealing operation.

9. The method of fabricating edge codable cards of the type having a coding edge configured to form a plurality of teeth, a front edge transverse to the coding edge, a rear edge extending parallel to the front edge, and a ferromagnetic chip mounted in a notch at the corner of the front edge and coding edge, the chip presenting an edge at the front edge of the card adapted to be engaged and attracted to a magnet in a mechanized retrieval device, said method comprising the steps of:

dieing out from a sheet of card stock a generally rectangular blank having a front edge and a coding edge, forming a notch at the corner of said front edge and coding edge, coining a band along the peripheral edges of said notch, disposing a ferromagnetic chip in said notch, said chip being thinner than said blank, looping heat sealable tape over an edge of said card and on opposite sides of said chip, said tape partially overlying said coined bands, heat sealing said tape to said chip and said coined bands, subjecting said card to a final dieing operation to configurate said coding edge to form a locking notch and a plurality of teeth and to simultaneously trim said chip along said front edge and a portion of said rear edge to establish a relationship between said front edge of the chip and said teeth and to establish the working length of said card.

10. The method of claim 9 in which the tape is looped over said coding edge and in which said final dieing operation trims away the portion of said tape looped around said edge.

11. The method of claim 10 in which said tape is tacked to said chip and said coined bands prior to heat sealing.

12. The method of claim 11 in which said card and said chip are disposed in a track with the notch in said card being disposed adjacent to said track and advancing toward and in registry with said chip to cause said chip to be disposed in said notch.

13. The method of claim 12 in which said card and said chip are advanced further into contact with a strip of tape disposed transversely of said notch to cause said tape to loop over said chip and card.

14. The method of claim 13 in which one edge of said chip remains spaced from the adjacent edge of said card.

References Cited

UNITED STATES PATENTS

| | | | |
|---|---|---|---|
| 2,591,519 | 4/1952 | Decker | 156—514X |
| 2,643,786 | 6/1953 | Baker | 156—514X |
| 2,869,748 | 1/1959 | Nerwin | 156—514X |
| 3,043,363 | 7/1962 | Byers | 156—514 |
| 3,163,569 | 12/1964 | Brundage | 156—514X |
| 3,190,784 | 6/1965 | Heydon | 156—514X |
| 3,478,877 | 11/1969 | Parry | 209—80.5 |

SAMUEL FEINBERG, Primary Examiner

D. BENT, Assistant Examiner